(12) United States Patent
Settje et al.

(10) Patent No.: US 7,177,112 B2
(45) Date of Patent: Feb. 13, 2007

(54) INITIAL LEARN OF ADAPTIVE FEEDFORWARD COEFFICIENTS

(75) Inventors: Christopher Thomas Settje, Westminster, CO (US); Khalil B. Dizaji, Louisville, CO (US); Michael Edward Baum, Longmont, CO (US); Rodney Brittner, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 681 days.

(21) Appl. No.: 10/115,384

(22) Filed: Apr. 3, 2002

(65) Prior Publication Data

US 2003/0123180 A1 Jul. 3, 2003

Related U.S. Application Data

(60) Provisional application No. 60/340,177, filed on Dec. 14, 2001.

(51) Int. Cl.
*G11B 5/596* (2006.01)

(52) U.S. Cl. ................................. 360/77.04

(58) Field of Classification Search ............. 360/77.04, 360/77.08, 50, 77.05; 700/45
See application file for complete search history.

(56) References Cited

U.S. PATENT DOCUMENTS

| | | | |
|---|---|---|---|
| 4,628,379 A | 12/1986 | Andrews, Jr. et al. | |
| 5,404,253 A | 4/1995 | Painter | |
| 5,539,714 A | 7/1996 | Andrews, Jr. et al. | |
| 5,550,685 A * | 8/1996 | Drouin | 360/77.08 |
| 5,825,568 A | 10/1998 | Lee | |
| 5,949,605 A * | 9/1999 | Lee et al. | 360/77.04 |
| 5,959,952 A | 9/1999 | Wakuda | |
| 6,141,175 A * | 10/2000 | Nazarian et al. | 360/77.04 |
| 6,310,742 B1 * | 10/2001 | Nazarian et al. | 360/77.04 |
| 6,437,936 B1 * | 8/2002 | Chen et al. | 360/77.04 |
| 6,611,391 B1 * | 8/2003 | Murphy et al. | 360/50 |
| 6,650,499 B1 * | 11/2003 | Kusumoto | 360/77.04 |
| 6,684,114 B1 * | 1/2004 | Erickson et al. | 700/45 |

* cited by examiner

*Primary Examiner*—Fred F. Tzeng
(74) *Attorney, Agent, or Firm*—Randall K. McCarthy

(57) ABSTRACT

The present invention reduces the time required for coefficient convergence and thus improves time-to-ready. To that end, the present invention provides an initial learn—preferably non-zero—coefficient. The initial learn coefficient is based on a translation of timing information to position information. One aspect of the present invention uses address marks of a disc then translates them to phase position information. The present invention measures the times between address marks of adjacent servo sectors. Variations between those times is related is related to disc runout, particularly disc eccentricity. Also, the servo sectors are used to identify at which phase the maximum amplitude (or magnitude) of the timing variations occur. This phase information and maximum amplitude are used as variables in determining the initial learn coefficient. The present invention also utilizes a plant model to predetermine a variable. This variable is used in conjunction with the phase and maximum amplitude variables to determine the initial learn coefficient. Other aspects of the present invention use approximations or statistical values to determine the initial learn coefficient. For example, the maximum amplitude can be based on a clearance between an inner diameter of a disc and a spindle. The phase can be based on a value within a range of phases. The plant model can be changed to include assumptions, approximations or other factors.

20 Claims, 5 Drawing Sheets

INITIAL LEARN OF ADAPTIVE FEEDFORWARD COEFFICIENTS

RELATED APPLICATIONS

This application claims priority to U.S. Provisional Application No. 60/340,177 filed Dec. 14, 2001, entitled "INTIAL LEARN OF ADAPTIVE FEEDFORWARD COEFFICIENTS."

FIELD OF THE INVENTION

The present invention relates to storage apparatus and more particularly to compensating for runout of a storage medium.

BACKGROUND

Many apparatus that need information storage rely on some sort of storage device. A typical storage device is a hard disc drive, commonly known as a hard drive. Part of the evolution of such a device is increased storage capacity, smaller size and faster data availability. Inherent in that evolution is the increase of unit linear or areal density. For example, a hard drive contains at least one storage medium that saves information in concentric tracks. As the drives evolve, there is an increase in the tracks per inch (TPI) of the medium. Decreased tolerances are required for the mechanisms that read and write to those tracks.

Manufacturing processes have the tracks defined—prior to data being written and read—by a servo track writer. This servo track writer writes servo information to the storage medium. In one case, the track writer is entirely separate from the disc drive. This is known as multi-disc write (MDW). This servo information will be used by the disc drive to read and write information to the storage medium. Thus, the servo information is prewritten to the storage medium to be later used to define each track.

One unwelcome side effect of media with prewritten servo information is an increase in rotational eccentricity between the servo information and the axis of rotation of the disc drive. FIG. 1 illustrates this effect. A disc 100 centered at an axis point 110 has diametrically-opposed circumferential points 120 and 130. Assume that servo information is written at the circumference of disc 100 so that it includes points 120 and 130. Ideally, when disc 100 is rotated about axis point 110, all points along the circumference of disc 100 will pass through the same position as point 120. Axis 110 is the rotational axis of disc 100 in the servo writer.

However, when disc 100 is rotated about an axis point 140, which is offset from axis point 110, eccentricity is introduced. This occurs, for example, when disc 100 is placed in a disc drive. The axis 140 is the rotational axis of disc 100 in the disc drive. As a result, point 120 will follow a path signified by dashed circumference 150. Likewise, point 130 will follow a path signified by dashed circumference 160 and pass through point 170. If a read/write head of the disc drive were positioned over point 120 at the start of rotation about axis 140, then it would have to move to point 170 to stay on the center of the track. This movement, referred to as eccentricity, is indicated by a position error signal 200 shown in FIG. 2A. The frequency of this signal would be the rotational rate of disc 100.

Such eccentricity can be compensated for to a certain degree depending on its severity. Typically, a closed-loop servo system will obtain the eccentricity information from a position error signal (PES). In response, the system will provide a control signal that compensates for the eccentricity. However, such a system is constrained by the amount of eccentricity that it can compensate. Thus, when the eccentricity is large enough, this servo system is not effective.

The eccentricity described with reference to FIG. 1 also creates a problem with time-to-ready, an important disc drive metric. In particular, upon spin-up of the hard drive, the first harmonic (or 1f) coefficients for adaptive feedforward compensation (AFC) are initially set to zero. These coefficients are applied to sine and cosine values that are injected into a servo loop to compensate for the eccentricity. However, high eccentricity—which affects 1f coefficients—can potentially take many revolutions for the AFC coefficients to converge. These many revolutions used by the actuator to converge on track will ultimately have a negative impact on time-to-ready.

SUMMARY OF THE INVENTION

The present invention reduces the time required for coefficient convergence and thus improves the time-to-ready metric. To that end, the present invention provides an initial learn—preferably non-zero—coefficient. The initial learn coefficient is based on a translation of timing information to position information. One aspect of the present invention uses timing of servo field address marks and translates them to phase position information.

The present invention measures the times between address marks of adjacent servo sectors. Variations between those times is related to disc runout, particularly disc eccentricity. Also, the servo sectors are used to identify at which phase the maximum amplitude (or magnitude) of the timing variations occur. This phase information and maximum amplitude are used as variables in determining the initial learn coefficient. The present invention also utilizes a plant model to predetermine a variable. This variable is used in conjunction with the phase and maximum amplitude variables to determine the initial learn coefficient. Preferably, this variable translates the timing variation information into the initial learn coefficient.

Other aspects of the present invention use approximations or statistical values to determine the initial learn coefficient. For example, the maximum amplitude can be based on a clearance between an inner diameter of a disc and a spindle. The phase can be based on a value within a range of phases. The plant model can be changed to include assumptions, approximations or other factors.

These and various other features and advantages, which characterize the present invention, will be apparent from a reading of the following detailed description and a review of the associated drawings.

DETAILED DESCRIPTION

Figure 1:
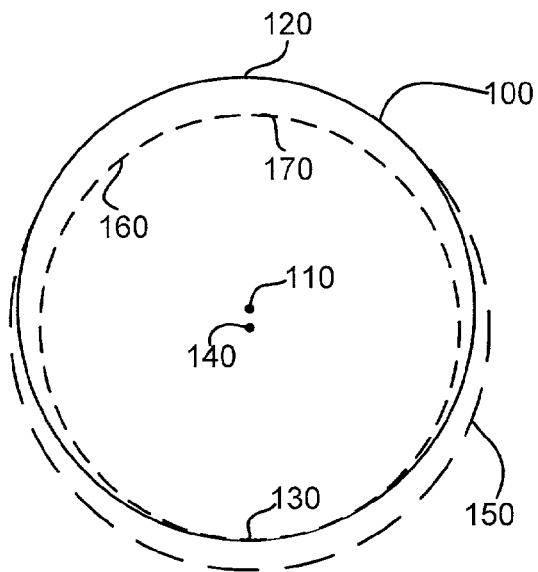
FIG. 1 illustrates disc eccentricity.

While this invention is susceptible of embodiment in many different forms, there is shown in the drawings and will be described herein in detail specific embodiments thereof with the understanding that the present disclosure is to be considered as an exemplification of the principles of the invention and is not to be limited to the specific embodiments described.

Figure 2A:
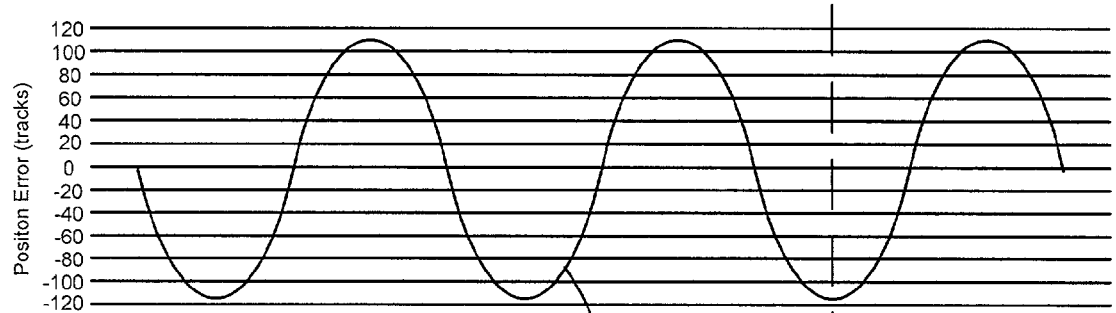
FIGS. 2A and 2B show the relationship between position error and repeatable timing error signals.
Figure 2B:
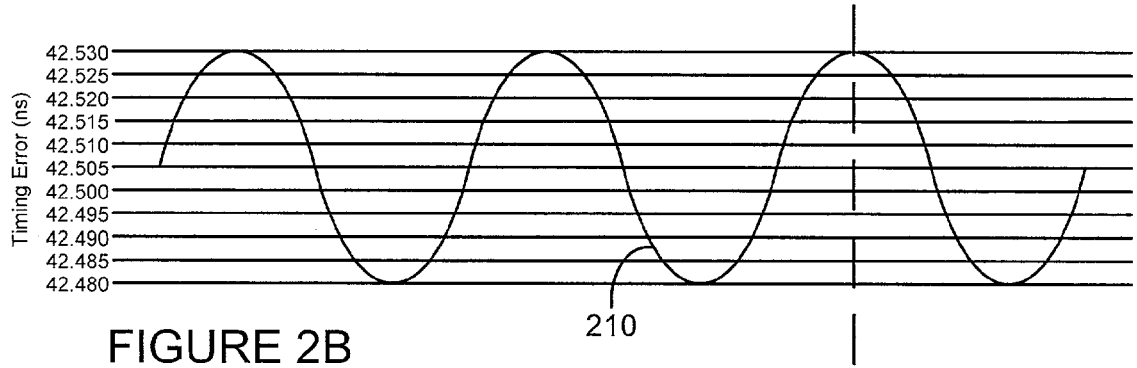

The present invention correlates timing information (differences) to runout. Specifically, the present invention uses the relationship between repeatable timing error (RTE) and a position error caused in part by disc eccentricity. Repeatable timing error is based on the difference between address marks (AM) of preferably adjacent servo fields along a track. FIG. 2B shows repeatable timing error (RTE) signal 210. As shown in FIGS. 2A and 2B, a phase difference of about 180 degrees exists between the position error signal 200 and an RTE signal 210 as shown by dashed line 220. By determining the amplitude and phase of the RTE signal 210, information is available to calculate the 1f feedforward compensation command. In particular, the information is used to determine the initial learn coefficient.

One aspect of the present invention can be generally stated as follows. The spin-up process for a disc drive is begun. Starting by initially biasing in the actuator (the BiasInInit actuator state), the RTE signal is detected and the amplitude at each servo sector is measured. Preferably, sixteen revolutions are used. That measuring should conclude with the determination of the servo sector that corresponds to the maximum RTE amplitude. Thus, magnitude (amplitude) and phase information are determined. The 1f AFC initial learn coefficients are determined based on the measured RTE magnitude and phase information as follows:

$$AFC_{sine} = RTE\ \text{amplitude} \times K_{afc} \times \text{sine (max amplitude servo sector)} \quad (1)$$

$$AFC_{cos} = RTE\ \text{amplitude} \times K_{afc} \times \text{cosine (max amplitude servo sector)} \quad (2)$$

where RTE amplitude is preferably the peak-to-peak value of the RTE, sine (max amplitude servo sector) and cosine (max amplitude servo sector) are values preferably retrieved from sine and cosine tables used for feedforward compensation according to the phase of the RTE maximum amplitude, and $K_{afc}$ is determined by the following assumptions and equations based in part on a model of the plant (505 in FIG. 5) and in particular a Seagate Technology LLC product known as "Snowmass":

AFC bits for 1x (the rotational frequency) should be the square root of the sum of squares of coefficients:

$$\text{bit} := 1 \qquad \text{bit}_{1x} := 1.$$

The motor constant in the plant is:

$$K_t := 4.12\ \text{in} * \text{oz/A} \qquad K_t\ 2.967\ 10^{-3}\ \text{m} * \text{kg/A}.$$

The head inertia in the plant is:

$$J := 2.597 \times 10^{-4}\ \text{in oz s}^2 \qquad J = 1.87 \times 10^{-7}\ \text{kg m s}^2.$$

Head arm length in the plant is:

$$L := 1.945\ \text{in} \qquad L = 0.049\ \text{m}.$$

Actuator constant in the plant is:

$$K_{act} := L \times K_t / J \qquad K_{act} = 783.752\ \text{m/(s}^2 \times \text{A)} \qquad K_{act} = 3.086 \times 10^4\ \text{in/(s}^2 \times \text{A)}.$$

Power amp gain in the plant is:

$$K_{pa} := 1.038 \times 10^{-4}\ \text{A/bit} \qquad K_{pa} = 1.038 \times 10^{-4}\ \text{A}.$$

"Shift-right" gain factor is preferably the greater of the following:

$$K_{mdw} := \tfrac{1}{2} \qquad K_{snowmass} := 1/32 \qquad K_{shift} := K_{mdw}.$$

Acceleration constant is:

$$K_{lump} := K_{act} \times K_{pa} \times K_{shift} \qquad K_{lump} = 0.041\ \text{m/s}^2\ \text{per bit}.$$

The rotation rate is:

$$\omega_{1x} := 2\pi \times 120\ \text{rad/s}.$$

Peak runout is:

$$Amp_{1x} := K_{lump}/\omega_{1x}^2\ (\text{bits}_{1x}) \qquad Amp_{1x} = 2.817 \times 10^{-6}\ \text{in}$$

Next, the AFC initial learn gain $K_{afc}$ will be determined. This gain will translate the repeatable timing error (due to disc misalignment, eccentricity or other types of runout) into scaled AFC sine and cosine coefficients. First, an assumption is made about a lock radius. For this case, midstroke will be used:

$$\text{radiusid} := 0.85\ \text{in} \qquad \text{radiusod} := 1.87\ \text{in}$$

$$\text{radiusmid} := \text{radiusid} + (\text{radiusod} - \text{radiusid})/2$$

$$\text{radiusid} = 1.36\ \text{in}$$

The amount of radial runout for each servo clock of RTE is determined as:

$$srvo\_clk := 5 \times 10^{-9}$$

$$sample := 196$$

| | |
|---|---|
| $T_{rev} := 60/7200$ s | $T_{rev} = 8.333 \times 10^{-3}$ s |
| $T_{samp} := T_{rev}/sample$ | $T_{samp} = 4.252 \times 10^{-5}$ s |

$$RRO \text{ (repeatable runout)} := radiusmid \times servo\_clk/T_{samp}$$

$$RRO = 1.599 \times 10^{-4} \text{ in } (RRO \text{ units are in/servo clk})$$

The bits/servo clocks of repeatable runout error is converted to gain as:

$$K_{afc} := RRO/Amp_{1x}$$

$$K_{afc} = 56.775 \text{ (units are } AFC \text{ bits/servo clocks of } RTE \text{ amplitude)}.$$

The $K_{afc}$ value is inserted into equations 1 and 2 above to determine each initial learn sine and cosine coefficient $AFC_{sine}$ and $AFC_{cosine}$. For those equations, it should be apparent that $K_{afc}$ can be predetermined and stored. The values RTE amplitude, the sine (max amplitude servo sector) and cosine (max amplitude servo sector) are preferably determined once at spin-up.

Figures 3A, 3B:
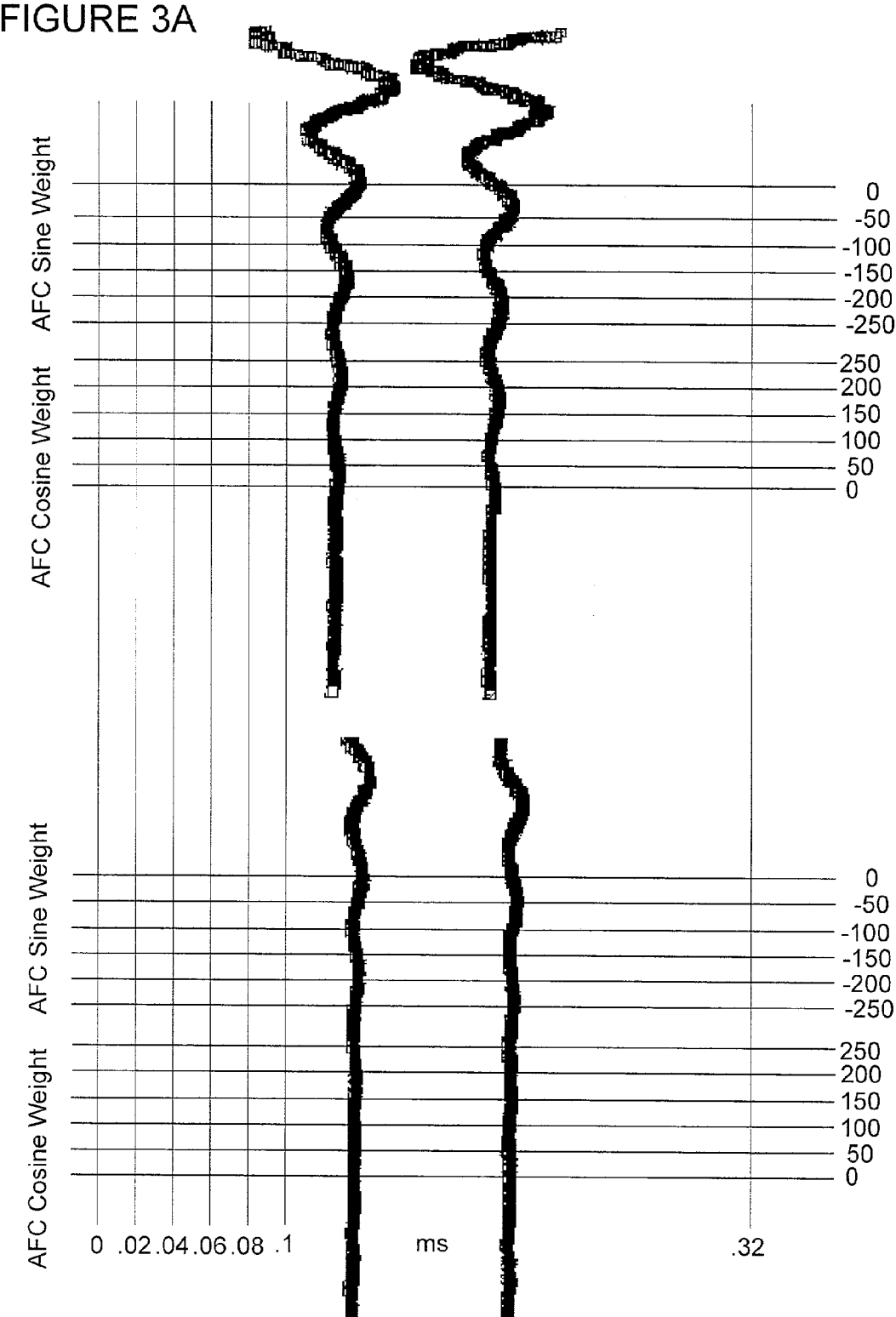
FIGS. 3A and 3B illustrate coefficient signals resulting from the use and non-use of the present invention.

FIGS. 3A and 3B illustrate the effectiveness of the present invention. FIG. 3A shows two traces that represent the AFC Cosine and Sine Coefficients without using the present invention. These traces start at zero and show about a 80 ms track follow settle. This will add directly to the time-to-ready of the disc drive, an undesirable attribute. FIG. 3B shows two traces that represent the AFC Cosine and Sine Coefficients using the present invention. The traces start at a non-zero value. As can be seen, the traces are smoother than those in FIG. 3A, meaning they converge quicker. The present invention has reduced that undesired track follow settle time shown in FIG. 3A. As a result, time-to-ready will improve, with an expected substantial reduction.

Figure 4:
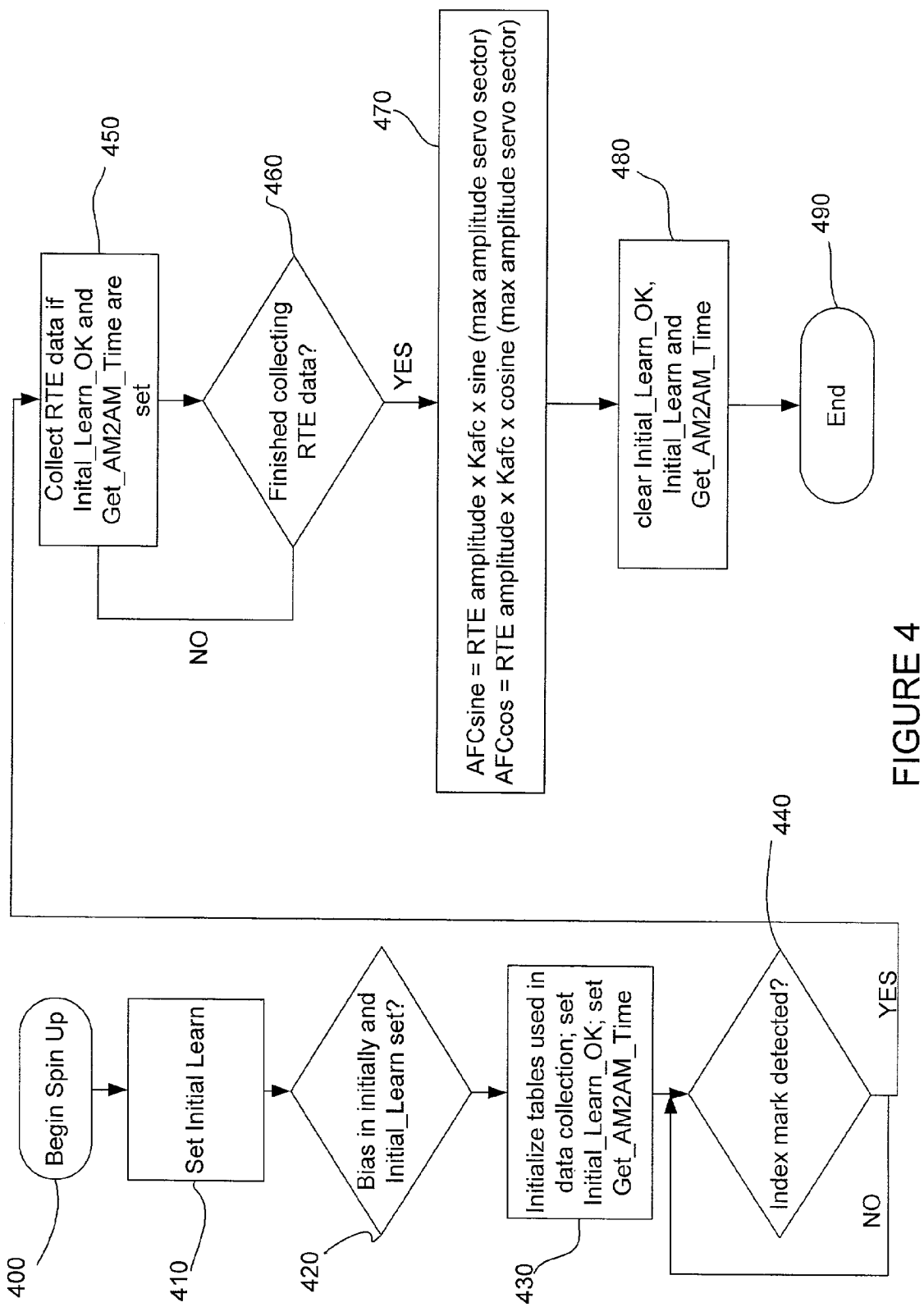
FIG. 4 is a flow chart of an embodiment of the present invention.

FIG. 4 is a flow chart that shows another aspect of the present invention. At step 400, the disc drive is spun up. At step 410, the AFC_Initial_Learn bit is set to start the initial learn method of the present invention. At step 420, the actuator is biased to a predetermined track. That track is chosen to ensure reliable reading of the address marks. Also in step 420, a determination is made whether the AFC_Initial_Learn bit is set. If the actuator is biased and the AFC_Initial_Learn bit is set, then the method proceeds to step 430. At that step, the table used for data collection (these are preferably stored in memory in the drive) are initialized. An AFC_Initial_Learn_OK bit and a Get_AM2AM_time bit are set. The method proceeds to step 440 where a determination is made whether the index mark of the predetermined track has been detected. If not, then the method preferably repeats step 440 until the index mark is detected.

Once the index mark is detected in step 440, the method next performs step 450. There, RTE data is collected if the AFC_Initial_Learn_OK and a Get_AM2AM_time bits are set active. Step 460 determines if the RTE data collection is finished; the present invention uses a preferred sixteen revolutions. If no, then the method returns to step 450. If yes, the method proceeds to step 470 where the sine and cosine AFC coefficients according to the present invention are determined. Once determined, the method proceeds to step 480 where all the register bits are cleared. The method proceeds to step 490 where it ends. As such, the present invention reduces the time required for coefficient convergence and thus improves time-to-ready.

Figure 5:
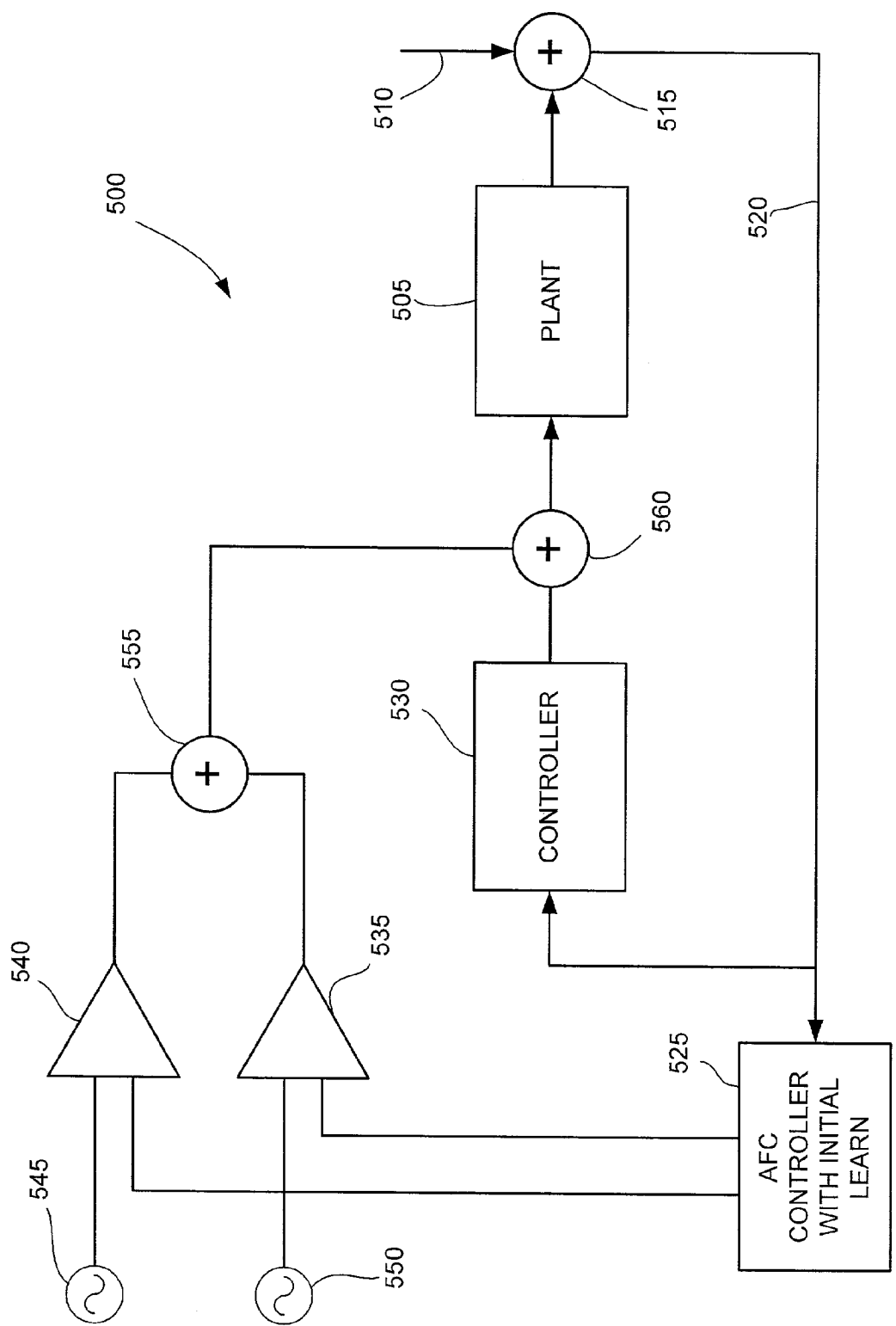
FIG. 5 is a block diagram of an embodiment of the present invention.

FIG. 5 shows a servo control system 500 according to a further aspect of the present invention. A plant 505 interacts with the storage medium, such as a disc, to provide position information. Plant 505 includes the spindle motor, head positioning mechanism and related electronics. Physical disturbances (or perturbations) such as runout or eccentricity are illustratedly shown as being provided on line 510, which is combined with the head position information from plant 505. The result of such a combination is a position error signal (PES) provided on lead 520. In particular, provided on lead 520 is the detection of address marks that are used to correlate to runout or eccentricity. The signals on lead 520 are provided to an AFC controller with initial learn (AFC controller) 525 and a controller 530. Either or both controllers can be implemented entirely in hardware or software-controlled hardware, or a combination of both. Software-controlled hardware includes microprocessors, microcontrollers, digital signal processors or any type of state machine.

AFC controller 525 provides outputs to amplifiers 535 and 540. These outputs are the initial learn coefficients for the AFC. Amplifiers 535 and 540 use these coefficients to respectively attenuate or amplify a cosine signal from a signal generator 550 and a sine signal from a signal generator 545. Preferably, the signal generators are tables that store normalized sine and cosine information. The outputs of amplifiers 535 and 540 are combined at a combiner 555. The output of combiner 555 is provided to a combiner 560. Combiner 560 combines that output with a plant control signal from controller 530. As such, the output of combiner 555 is used to at least minimize the disturbances contained in the PES, specifically the disc eccentricity. The signal is then provided to plant 505 to better track the storage medium.

AFC controller 525 performs the functions of the present invention and can also perform a conventional learn mode for converging the sine and cosine coefficients $AFC_{sine}$ and $AFC_{cosine}$. In operation, the initial learn of adaptive feed-forward coefficients is performed as described herein. This can be done open-loop. Then, servo system 500 switches to a conventional coefficient learn mode. This switching occurs preferably close to track follow after a seek, and more preferably at the transition from track seek to track follow. This can occur approximately one track from the desired track.

As discussed above, the present invention provides an initial learn value or coefficient to decrease the time to convergence of the learn coefficients. Preferably, that initial learn value or coefficient is non-zero. To that end, the present invention translates timing information, e.g. address mark times, to position information, e.g. runout. The translation is accomplished by the equations 1 and 2. It may be desired to utilize different methods in determining the variables of those equations. For example, $K_{afc}$ was calculated from the model discussed above. Yet $K_{afc}$ can be calculated with less or more precision, such as by using approximations or considering other factors in the model.

Figure 6:
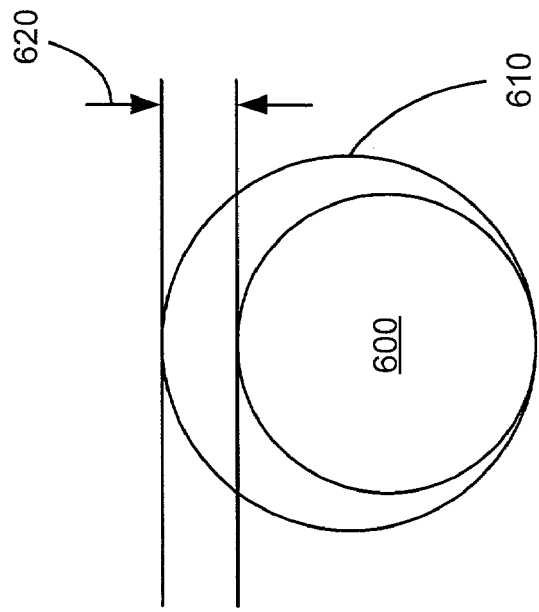
FIG. 6 shows a clearance between a servo track writer spindle and an inner diameter of a disc.

For the RTE amplitude, approximations or statistical values may be used. To illustrate, the RTE amplitude can be set equal to the clearance between the hub of a servo track writer and the inner diameter of the disc. Referring to FIG. 6, a spindle 600 is disposed within an inner diameter 610 of a disc. A clearance 620 is defined between spindle 600 and inner diameter 610 as shown. The spindle can be that of a servo track writer or the disc drive. The value of the clearance can be used for the RTE amplitude. Other factors may be included, such as runout caused by the written servo tracks.

Figure 7:
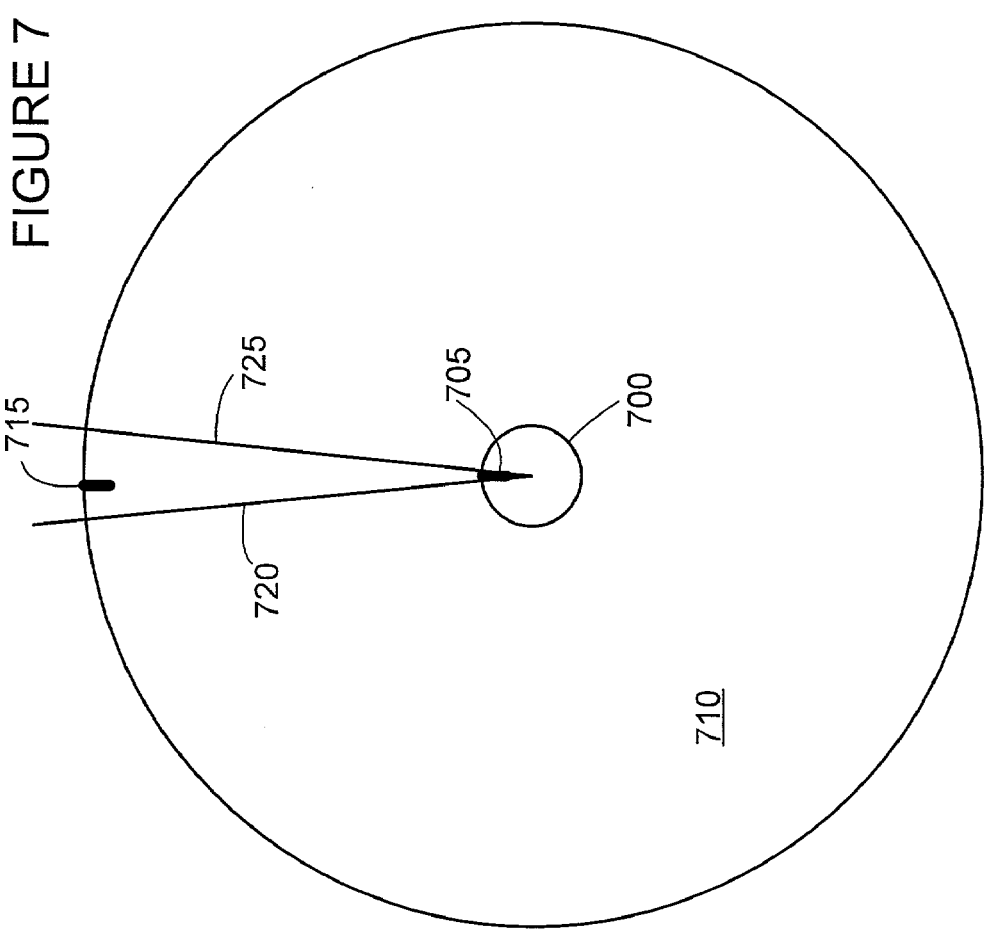
FIG. 7 shows a phase range relative to placement of a disc with a hub.

For the phase, which is referred to in equations 1 and 2 as the RTE (maximum) amplitude servo sector, a range can be defined and a value picked within that range. Or a value can be picked, such as through statistical methods. Referring to FIG. 7, a hub 700 with a mark 705 is shown that is disposed over a disc 710 that has a mark 715. Mark 715 can be used to align disc 710 with both the servo track writer spindle and disc drive spindle. In this manner, the phase of the RTE amplitude should be easily predictable within a phase range. The phase range can be defined as shown by being subtended by radii 720 and 725. As a result, when disc 710 is disposed within a disc drive and aligned with hub mark 705 within the phase range shown, the phase of the RTE amplitude will be known within that range. A value or values can the be used from that range.

Furthermore, the present invention is not limited to measuring variations between address marks of adjacent servo sectors. Instead, non-adjacent servo sectors can be used. For instance, the variations between address marks of every tenth servo sector could me utilized. Also, other marks or information written on the disc beside the address marks can be used to determine timing errors that correlate to runout. To illustrate, timing variations between bursts can be used. And although the present invention uses hardware to measure the variations, software can be used to perform that function.

In view of the detailed discussion above, the present invention can provide initial learn coefficients that are based on disc drive characteristics. Those characteristics can correlate to runout. As a result, the present invention provides for quicker convergence of the learn coefficients. That in turn will reduce the time-to-ready for a disc drive.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and that are encompassed in the appended claims.

What is claimed is:

1. A method of compensating for runout comprising the step of providing an initial learn coefficient that is generated from timing information.

2. The method of claim 1 wherein the step of providing includes the step of translating timing information to position information, wherein the determined initial learn coefficient is determined responsive to the position information.

3. The method of claim 1 further comprising the steps of initializing a learn coefficient to the determined initial learn coefficient having a non-zero value; and converging on the learn coefficient.

4. The method of claim 3 wherein the timing information has a relationship to the runout.

5. The method of claim 4 wherein the timing information is a timing relationship among information written on a disc.

6. The method of claim 5 wherein the information written on the disc are address marks.

7. The method of claim 5 wherein the timing relationship is determined from timing differences between address marks of adjacent servo sectors.

8. The method of claim 3 wherein the converging step occurs during a learn mode.

9. The method of claim 1 wherein the step for providing includes generating a magnitude value and a phase value.

10. The method of claim 9 further comprising the step of using a predetermined gain value.

11. The method of claim 1 further comprising the step of switching to a learn mode.

12. The method of claim 11 wherein the step of switching occurs about a transition to a track follow mode.

13. A method of compensating for disc eccentricity, comprising the steps of:
    determining repeatable timing errors;
    using the repeatable timing errors to generate initial learn coefficients; and
    using the learn coefficients to reduce a time for coefficient convergence for feedforward compensation.

14. The method of claim 13 wherein the learn coefficients are non-zero.

15. The method of claim 13 address marks are used to determine the repeatable timing errors.

16. The method of claim 13 wherein the step fur using the repeatable timing errors to generate initial learn coefficients includes generating a magnitude value and a phase value.

17. A servo control system comprising a controller that provides a determined initial learn coefficient.

18. The servo control system of claim 17 wherein the controller is adapted to perform a learn mode.

19. The servo control system of claim 17 wherein the controller receives information associated with a disc and uses the information to generate the initial learn.

20. A method comprising the steps of:
    using timing information to generate at least one initial learn coefficient; and
    using the at least one initial learn coefficient to reduce a time for coefficient convergence for feedforward compensation.

* * * * *